(12) United States Patent
Yang et al.

(10) Patent No.: US 8,361,331 B2
(45) Date of Patent: Jan. 29, 2013

(54) MEMS MIRROR SYSTEM FOR LASER PRINTING APPLICATIONS

(75) Inventors: Xiao Yang, Cupertino, CA (US); William Spencer Worley, III, Half Moon Bay, CA (US); Dongmin Chen, Saratoga, CA (US); Ye Wang, Cupertino, CA (US)

(73) Assignee: Miradia Inc., Santa Clara, CA (US)

( * ) Notice: Subject to any disclaimer, the term of this patent is extended or adjusted under 35 U.S.C. 154(b) by 50 days.

(21) Appl. No.: 13/009,964

(22) Filed: Jan. 20, 2011

(65) Prior Publication Data

US 2011/0111544 A1   May 12, 2011

Related U.S. Application Data

(62) Division of application No. 12/019,822, filed on Jan. 25, 2008, now Pat. No. 7,898,561.

(60) Provisional application No. 60/886,740, filed on Jan. 26, 2007.

(51) Int. Cl.
   *B29D 11/00* (2006.01)
   *H01L 21/302* (2006.01)

(52) U.S. Cl. .......... 216/24; 216/2; 216/41; 216/58; 438/66; 438/455; 438/459; 438/689; 438/706

(58) Field of Classification Search .......... 216/2, 24, 216/41, 58; 438/689, 66, 706, 455, 459
See application file for complete search history.

(56) References Cited

U.S. PATENT DOCUMENTS

| | | |
|---|---|---|
| 4,317,611 A | 3/1982 | Petersen |
| 5,771,060 A | 6/1998 | Nelson |
| 6,121,983 A | 9/2000 | Fork et al. |
| 6,407,560 B1 | 6/2002 | Walraven et al. |
| 6,598,985 B2 | 7/2003 | Hagelin et al. |
| 7,005,775 B2 | 2/2006 | Wan |
| 7,022,245 B2 * | 4/2006 | Pan et al. ............ 216/2 |
| 7,071,109 B2 | 7/2006 | Novotny et al. |
| 7,092,140 B2 | 8/2006 | Pan et al. |
| 7,118,234 B2 | 10/2006 | Pan et al. |
| 7,315,410 B2 | 1/2008 | Saitoh |
| 7,329,930 B2 | 2/2008 | Hung |
| 7,529,011 B2 | 5/2009 | Fujii |
| 7,535,620 B2 | 5/2009 | Zhou |
| 7,898,561 B2 | 3/2011 | Yang et al. |
| 2003/0048036 A1 | 3/2003 | Lemkin |
| 2005/0162811 A1 | 7/2005 | Obi et al. |
| 2006/0012844 A1 * | 1/2006 | Fujii et al. ............ 359/224 |
| 2006/0166463 A1 * | 7/2006 | Bakke et al. ............ 438/459 |
| 2008/0061026 A1 * | 3/2008 | Milanovic et al. .......... 216/2 |
| 2009/0153932 A1 | 6/2009 | Davis et al. |

OTHER PUBLICATIONS

Moussa et al., "Investigating the Reliability of Electrostatic Comb-Drive Actuators Utilized in Microfluidic and Space Systems Using Finite Element Analysis," Canadian Journal on Electrical and Computer Engineering, vol. 27, No. 4, 12 pages.

International Search Report and Written Opinion of PCT Application No. PCT/US08/52008, mailed on Aug. 29, 2008, 10 pages.

\* cited by examiner

*Primary Examiner* — Shamim Ahmed

(74) *Attorney, Agent, or Firm* — Kilpatrick Townsend & Stockton LLP

(57) ABSTRACT

A MEMS mirror for a laser printing application includes providing a CMOS substrate including a pair of electrodes, and providing a reflecting mirror moveable over the substrate and the electrodes. Voltages applied to the electrodes create an electrostatic force causing an end of the mirror to be attracted to the substrate. A precise position of the mirror can be detected and controlled by sensing a change in capacitance between the mirror ends and the underlying electrodes.

18 Claims, 15 Drawing Sheets

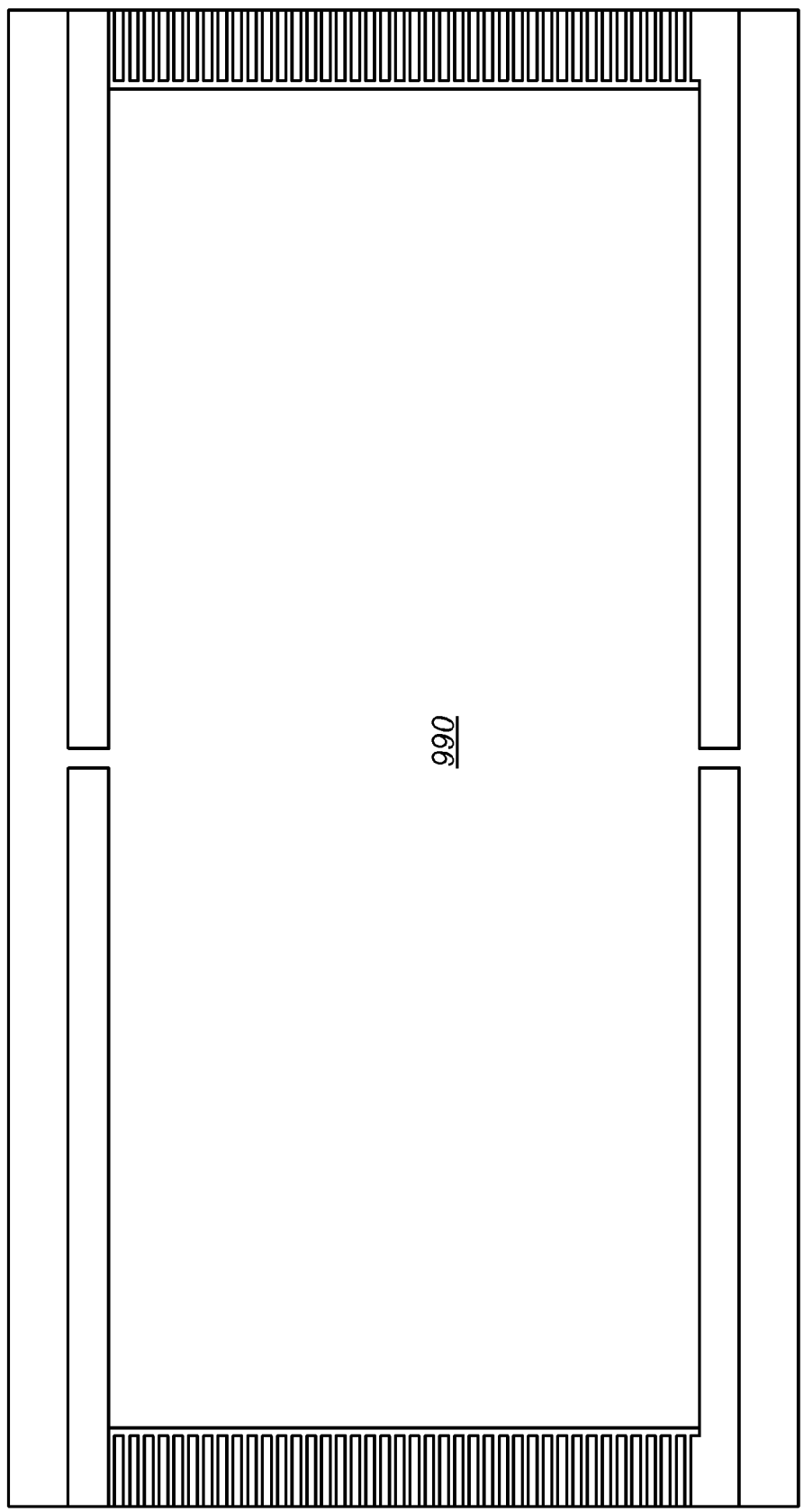

MEMS MIRROR SYSTEM FOR LASER PRINTING APPLICATIONS

CROSS-REFERENCES TO RELATED APPLICATIONS

The present application is a division of U.S. patent application Ser. No. 12/019,822 filed on Jan. 25, 2008, now U.S. Pat. No. 7,898,561, which claims benefit under 35 U.S.C. §119(e) of U.S. Provisional Patent Application No. 60/886,740, filed Jan. 26, 2007, entitled "MEMS mirror for laser printing application," the disclosures of both the applications are incorporated by reference herein in their entirety for all purposes.

Embodiments in accordance with the present invention relate generally to laser printing. In particular embodiments, the invention provides a method and apparatus for fabricating and operating a mirror coupled to a complementary metal oxide semiconductor (CMOS) substrate for use in laser printing. In a specific embodiment, at least a portion of the mirror structure is fabricated from a single crystal layer joined to the CMOS substrate through a wafer-level layer transfer process. Other embodiments of the present invention have a much broader range of applicability.

BACKGROUND OF THE INVENTION

Laser printing applications have become widespread. Despite improvements in the area of laser printing, there is a continuing need in the art for improved methods and systems related to laser printing.

SUMMARY OF THE INVENTION

According to the present invention, techniques related generally to the field of laser printing are provided. More particularly, the present invention relates to methods and systems for fabricating and operating a mirror coupled to a CMOS substrate. Other embodiments of the present invention have a much broader range of applicability.

According to an embodiment of the present invention, a laser printing apparatus is provided. The laser printing apparatus includes a laser source and a mirror configured to receive an incident laser beam from the source and reflect the laser beam toward a photosensitive element. The mirror includes a CMOS substrate bearing a first electrode and a second electrode and a reflecting surface supported above the CMOS substrate and rotatable about an axis in response to an electrostatic attraction force between an end of the reflecting surface and the first electrode.

According to another embodiment of the present invention, a printing method is provided. The printing method includes causing laser light to be reflected to a photosensitive element to alter an electronic state at a location on the photosensitive element, thereby causing an ink material to adhere thereto. The printing method also includes transferring the ink material from the photosensitive element to receiving medium and altering a position of the reflecting surface by generating an electrostatic attraction between an end of the reflecting surface and an electrode on an underlying CMOS substrate. The electronic state of a different location is changed and ink transferred to a different region of the paper.

According to an alternative embodiment of the present invention, a scanning mirror for a laser printing apparatus is provided. The scanning mirror includes a frame and a pair of fixed electrode finger sets coupled to the frame. Each of the fixed electrode finger sets includes a plurality of fixed fingers. The scanning mirror also includes a set of torsion hinges coupled to the frame, a mirror plate coupled to the torsion hinges, and a pair of moveable electrode finger sets coupled to the mirror plate. Each of the moveable electrode finger sets includes a plurality of moveable fingers. The plurality of moveable fingers are configured to interlace with the plurality of fixed fingers.

According to another alternative embodiment of the present invention, a method of fabricating a scanning mirror for a laser printing apparatus is provided. The method includes providing a Silicon-on-Insulator (SOI) substrate having a first silicon layer, a silicon oxide layer abutting the first silicon layer, and a second silicon layer abutting the silicon oxide layer. The method also includes forming a pair of moveable electrode finger sets from a first portion of the second silicon layer and forming a mirror plate from a second portion of the second silicon layer. The method further includes forming a pair of fixed electrode finger sets from a first portion of the first silicon layer and forming a mirror rotation region from a second portion of the first silicon layer. Moreover, the method includes removing the silicon oxide layer to form a mirror structure and mounting the mirror structure on an electrode substrate.

Numerous benefits are achieved using the present invention over conventional techniques. Some embodiments provide methods and systems that include one or more scanning mirrors with high bandwidth or throughput, allowing their rapid actuation to move the reflected laser quickly along a photosensitive element. Another advantage offered by embodiments of the present invention is a compact size or footprint, as the mirror surface can readily be fabricated utilizing existing techniques to have a surface area only slightly larger than the diameter of the spot of light received from the laser source. Still another advantage offered by embodiments of the present invention is low cost, as the mirrors can be readily fabricated in high volumes utilizing established semiconductor fabrication techniques. Depending upon the embodiment, one or more of these benefits may exist. These and other benefits have been described throughout the present specification and more particularly below. Various additional objects, features, and advantages of the present invention can be more fully appreciated with reference to the detailed description and accompanying drawings that follow.

BRIEF DESCRIPTION OF THE DRAWINGS

FIG. 9F is a simplified top view illustration of a MEMS mirror system fabricated according to the method illustrated in FIGS. 9A to 9D.

DETAILED DESCRIPTION OF SPECIFIC EMBODIMENTS

Embodiments of the present invention provide MEMS structures useful for laser printing applications. Combining MEMS technology with CMOS circuitry, it is possible to fabricate a moveable mirror structure useful in a wide variety of applications. The examples described herein are provided merely for purposes of illustration and are not intended to limit embodiments of the present invention.

Figure 1:
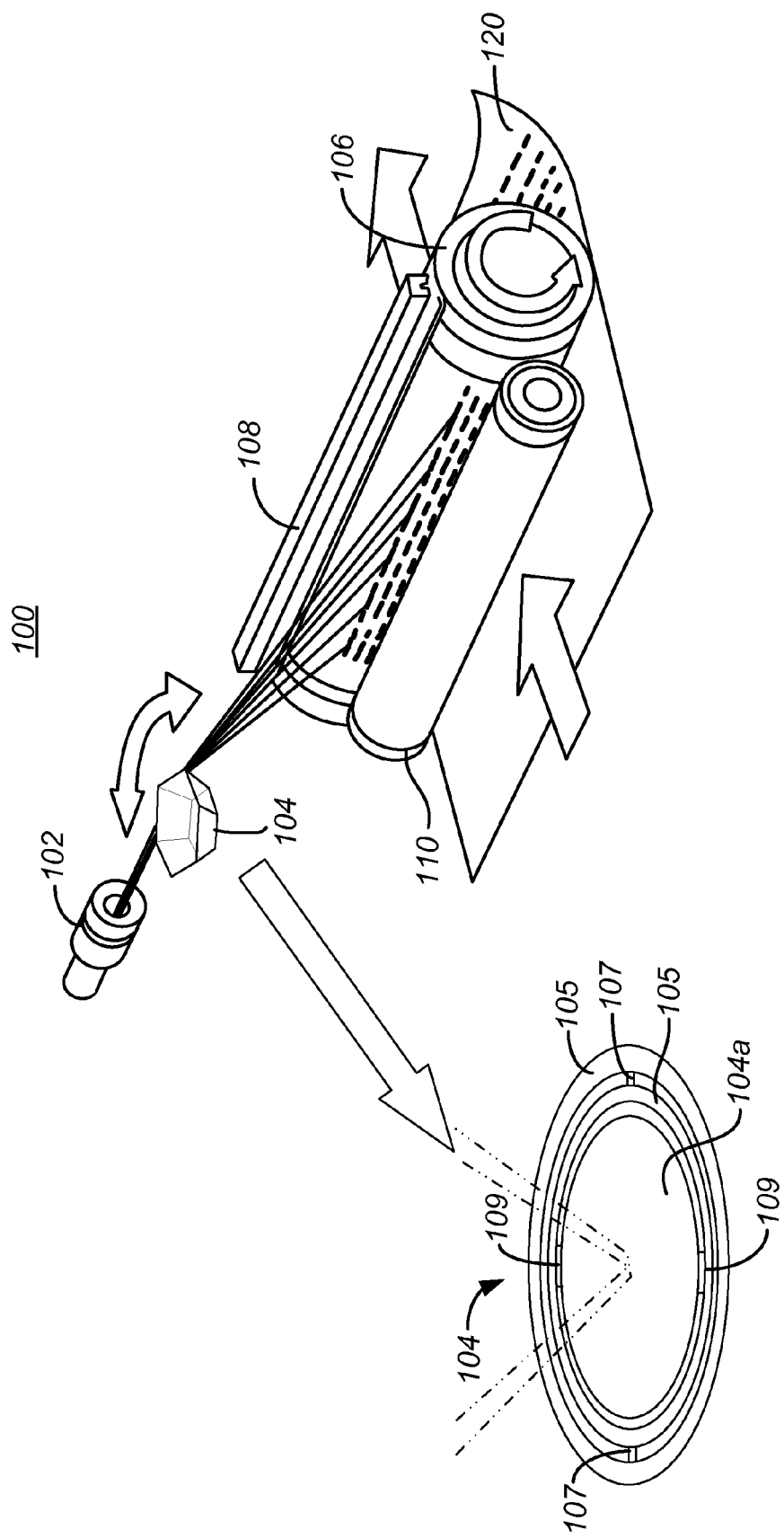
FIG. 1 is a simplified schematic diagram of an embodiment of a laser printing apparatus utilizing an embodiment of the present invention.

FIG. 1 is a simplified schematic diagram of an embodiment of a laser printing apparatus 100 utilizing an embodiment of the present invention. Specifically, laser printing apparatus comprises a laser scanning unit or source 102 in optical communication with a mirror 104. Light incident to mirror 104 is reflected to a photosensitive element 106, here a rotating photoreceptor drum. A charging electrode 108 (here a corona wire), is configured to impart charge to the surface of the photosensitive element. The rotating photoreceptor drum is in close proximity to a toner coated roller 110.

Application of the laser beam reflected by the mirror 104, to a surface of the photosensitive element 106, results in a localized change in the electrical state of the photosensitive element. This changed electrical state causes toner to become attached to the local area, which is then placed into contact with the underlying moving paper 120. This contact results in the toner being printed on the paper only in the local area.

Conventionally, the mirror element is created by machining or other expensive and time-consuming processes. As shown in FIG. 1, however, embodiments in accordance with the present invention propose to fabricate the mirror element 104 as a microelectromechanical structure (MEMS). Specifically, FIG. 1 shows MEMS mirror 104 comprising reflective surface 104a connected with and rotatable about surrounding frames 105 utilizing hinge pairs 107 and 109.

Figure 2:
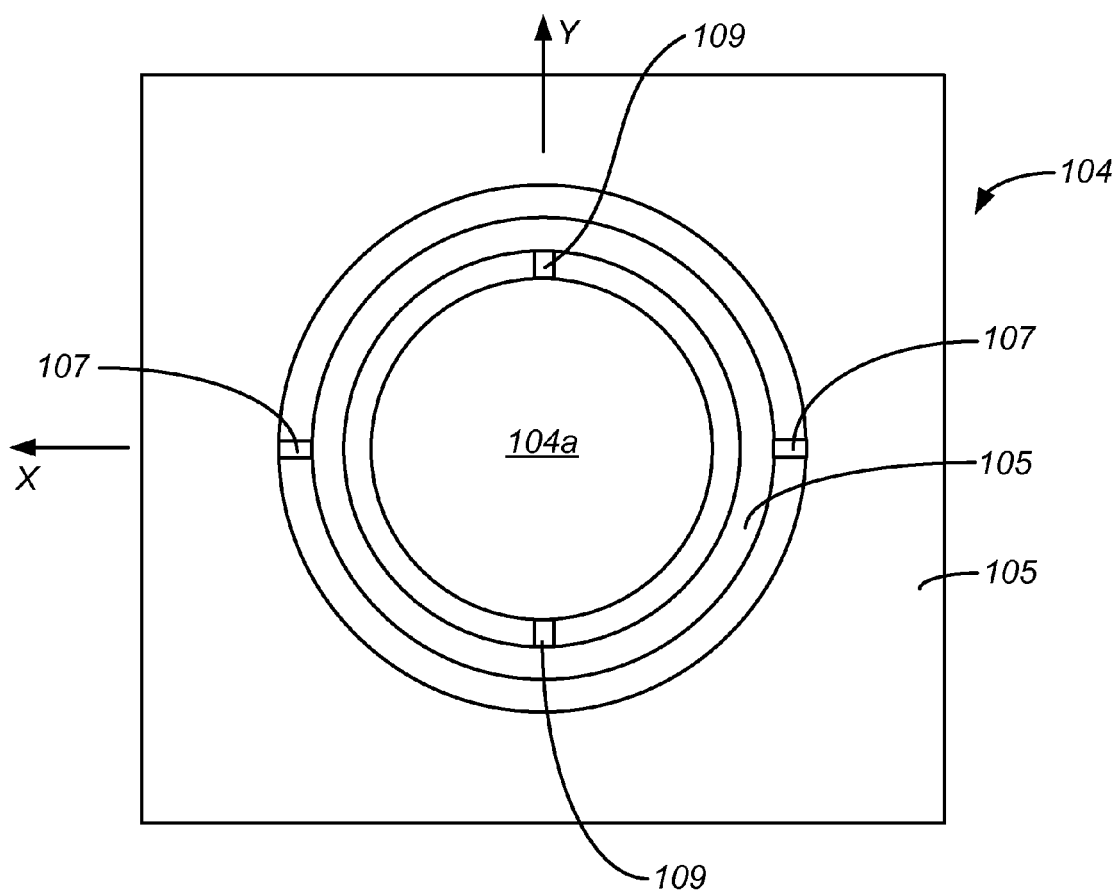
FIG. 2 is a simplified plan view of an embodiment of a dual-axis scanning mirror in accordance with an embodiment of the present invention.

FIG. 2 is a simplified top-view of a MEMS scanning mirror according to the embodiment of the present invention shown in FIG. 1. Mirror surface 104a in FIG. 2 is configured to be movable about two different axes. In particular, a first set of hinges 202 allow surface 104a to rotate about the X-axis, while second set of hinges 109 allow surface 104a to rotate about the Y-axis. Again, the various hinges and the moveable plate may all be fabricated from the continuous piece of material provided by the silicon layer according to embodiments of the present invention.

The shape of the moveable plate is illustrated as a circle in FIG. 2 merely by way of example. In other embodiments, other shapes are utilized as appropriate to the particular mirror application. One of ordinary skill in the art would recognize many variations, modifications, and alternatives.

Figure 3:
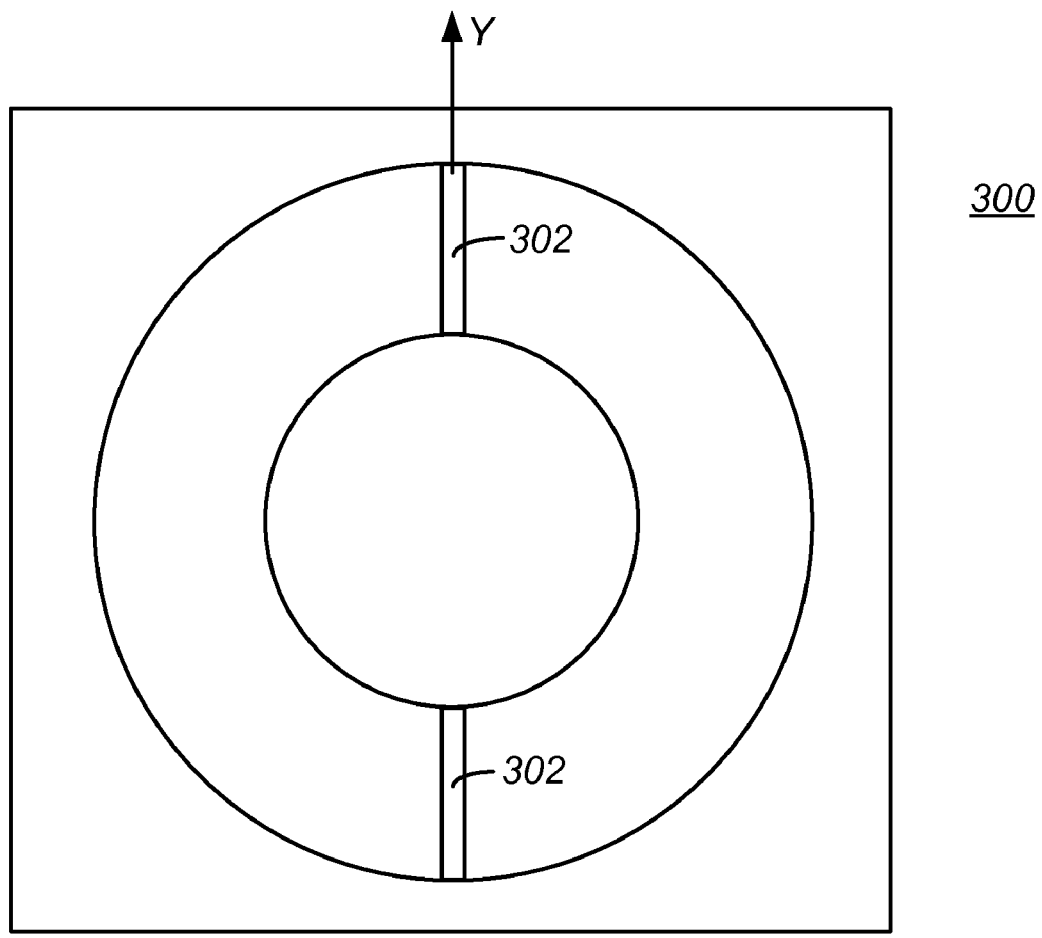
FIG. 3 is a simplified plan view of an embodiment of a single-axis scanning mirror in accordance with an embodiment of the present invention.

For example, FIG. 3 is a simplified top-view of a MEMS scanning mirror 300 according to an embodiment of the present invention. Specifically a single hinge pair 302 allows reflecting surface to rotate about the Y-axis. The hinges and the moveable plate may all be fabricated from the continuous piece of material provided by the silicon layer according to embodiments of the present invention.

FIGS. 4A-F illustrates a simplified process flow used to fabricate a scanning mirror according to an embodiment of the present invention. The process illustrated in FIGS. 4A-F is merely an example of a process flow and is not intended to limit the scope of embodiments of the present invention.

Figure 4A:
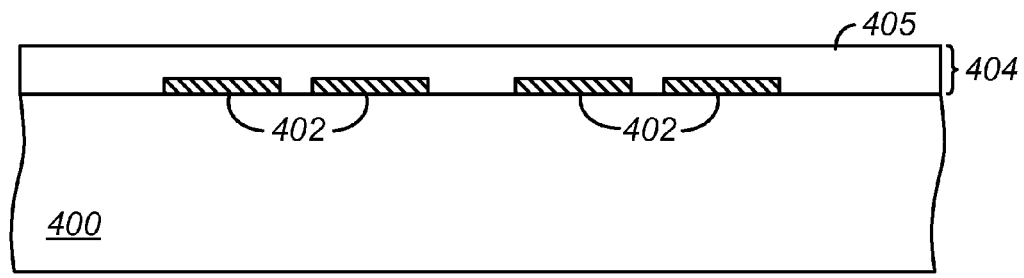
FIGS. 4A-F are simplified cross-sectional views showing the steps of an embodiment of a process flow in accordance with the present invention for fabricating a MEMS mirror structure.

In FIG. 4A, a CMOS substrate 400 is provided that includes a number of electrodes 402 on a surface of the CMOS substrate. The electrodes are electrically connected to other circuitry (not shown) in the CMOS substrate. Other components of the CMOS substrate are not illustrated for purposes of clarity. In an embodiment, the CMOS substrate is a fully processed CMOS substrate. Additional details of the fabrication processes for the device substrate are provided in co-pending and commonly owned U.S. Pat. No. 7,022,245 (Fabrication of a Reflective Spatial Light Modulator), filed Jan. 13, 2004, which is hereby incorporated by reference for all purposes. One of ordinary skill in the art would recognize many variations, modifications, and alternatives.

Although not illustrated in FIG. 4A, dielectric layer 404 is generally deposited on the CMOS substrate 400 and then planarized. The dielectric layer 404 may be formed from silicon oxide, silicon nitride, silicon oxynitride, combinations thereof, and the like. The upper surface of the dielectric layer is planarized using, for example, a CMP process, to form a bonding surface characterized by a predetermined surface roughness. In an embodiment, the surface roughness is less than 5 ÅRMS.

Electrodes 402 are typically formed by the deposition and/ or patterning of a metal layer. After formation of the electrodes, dielectric layer 404, with a thickness of $t_1$, is deposited on substrate 400. Layer 404 is a silicon dioxide ($SiO_2$) layer in a specific embodiment of the present invention, but as described more above, this is not required by the present invention. Other suitable materials may be used within the scope of the present invention. For example, layer 404 is formed by deposition of silicon nitride ($Si_3N_4$) or silicon oxynitride (SiON) layers in alternative embodiments. Moreover, polysilicon material, including amorphous polysilicon, is deposited to form layer 404 in yet another alternative embodiment according to the present invention.

The deposited layer 404 has a predetermined thickness $t_1$ as initially deposited. In a specific embodiment, the thickness $t_1$ is 2.6 m. In other embodiments, the thickness ranges from about 1.0 m to about 3.0 m. Of course, the thickness will depend on the particular applications. As illustrated in FIG. 4A, the upper surface 405 of the deposited layer 404 is uniform across the substrate 400 in FIG. 4A, resulting in a planar surface. However, a planar surface after deposition is not required by the present invention. In a particular deposition process, the patterned nature of the electrodes 402 results in the thickness of layer 404 varying as a function of lateral position, producing an upper surface 405 that is not entirely flat.

To planarize the upper surface 405 of the deposited layer 404, an optional CMP step is performed in an embodiment of the present invention. The results produced by the CMP process are illustrated by the polished surface in FIG. 4A. Material above the surface 405 is removed during the CMP process, resulting in a highly polished and planarized layer. In a particular embodiment, the root-mean-square (RMS) roughness of the planarized surface 405 is less than or equal to about 5 Å. As will be described below, the extremely smooth surface produced during the CMP process facilitates bonding of the composite substrate to the device substrate. In embodiments according to the present invention, the height of the polished layer 404 is about 1.9 m. Alternatively, the height ranges from about 0.5 m to about 2.5 m in other embodiments. Of course, the height will depend upon the particular applications.

Figure 4B:
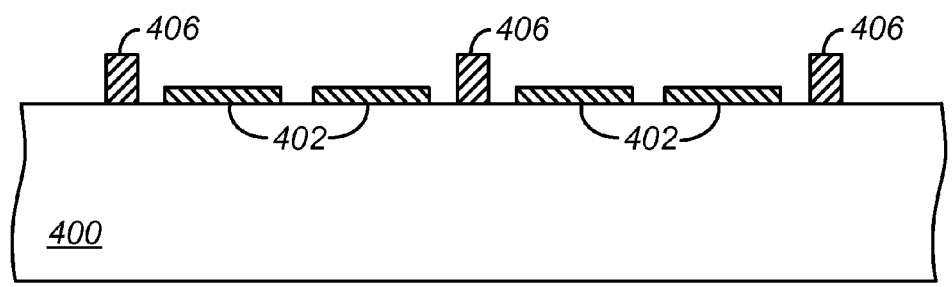

In FIG. 4B, the dielectric layer 404 previously formed, is selectively etched to create spacer structures 406 positioned to support a moveable reflecting surface over the substrate and the electrodes. As illustrated in the figure, portions of the dielectric layer 404 have been removed during the etch process, resulting in the formation of spacer structures 406.

Embodiments of the present invention in which the spacer structures are fabricated from silicon oxide, silicon nitride, or silicon oxynitride, or combinations thereof, provide benefits based on the electrical and thermal properties of the dielectric material. For example, these materials, among others, provide a high degree of electrical insulation, electrically isolating the device substrate from layers supported by the spacer structures. Moreover, the thermal properties of the material used to deposit layer 404, such as thermal insulation, are provided by some embodiments. Other suitable spacer structures materials, such as polysilicon material, including amorphous polysilicon are characterized by electrical and thermal properties that provide benefits in alternative embodiments.

As illustrated in FIG. 4B, an isotropic etch has been used to define the spacer structures 406. The etch profile defines vertical walls for the spacer structures with a predetermined thickness. In an embodiment, the lateral thickness of the spacer structures is 0.5 m. In other embodiments, the thickness of the spacer structures varies from about 0.25 m to about 1 m. An etch process that terminates at the upper surface of the electrodes 402 is used in an alternative process that results in simultaneous exposure of the electrodes and passivation of the surface of the substrate 400. In yet another embodiment, the etching process is terminated prior to exposure of the electrode layer, enabling the spacer structures to not only provide mechanical support in the form of the spacer structures, but additional passivation benefits to the electrodes on substrate 400.

As discussed above, in some embodiments of the present invention, the processes used to deposit, pattern, and etch the layer or layers from which the spacer structures are fabricated are performed at low temperatures. For example, these processing steps may be performed with a view to the structures present on the device substrate prior to the formation of the spacer structures, such as CMOS circuitry. Since some CMOS circuitry may be adversely impacted by performing high temperature deposition processes, which may damage metals coupling CMOS transistors or result in diffusion of junctions associated with the CMOS circuitry, low temperature deposition processes are utilized according to some embodiments of the present invention. Moreover, in a particular embodiment of the present invention, low temperature deposition, patterning, and etching processes, such as processes performed at temperatures of less than 500° C., are used to form the layer or layers from which the spacer structures are fabricated. In another specific embodiment, deposition, patterning, and etching processes performed at less than 400° C., are used to form the layer from which the spacer structures are fabricated. One of ordinary skill in the art would recognize many variations, modifications, and alternatives within the scope of low temperature processes.

Figure 4C:
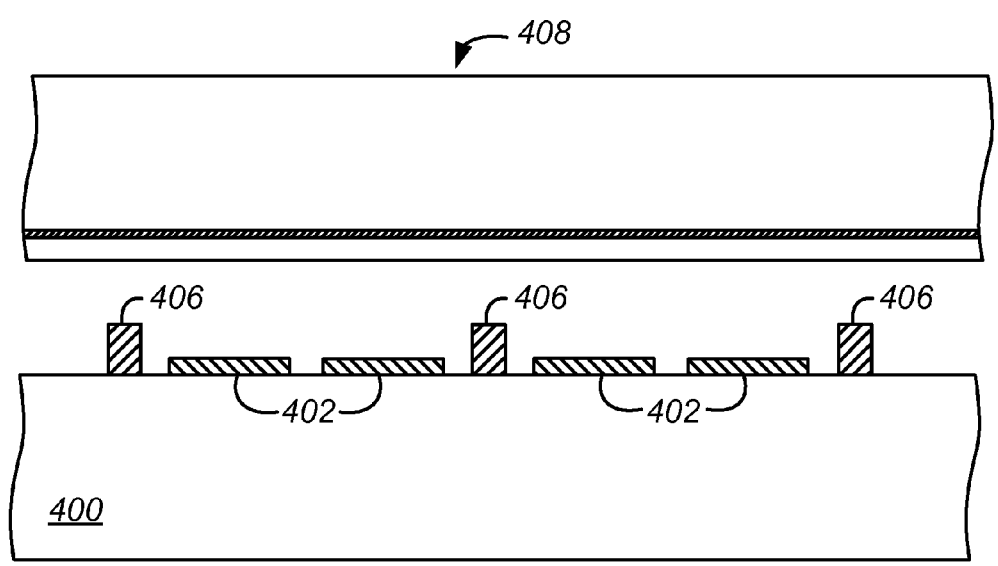
Figure 4D:
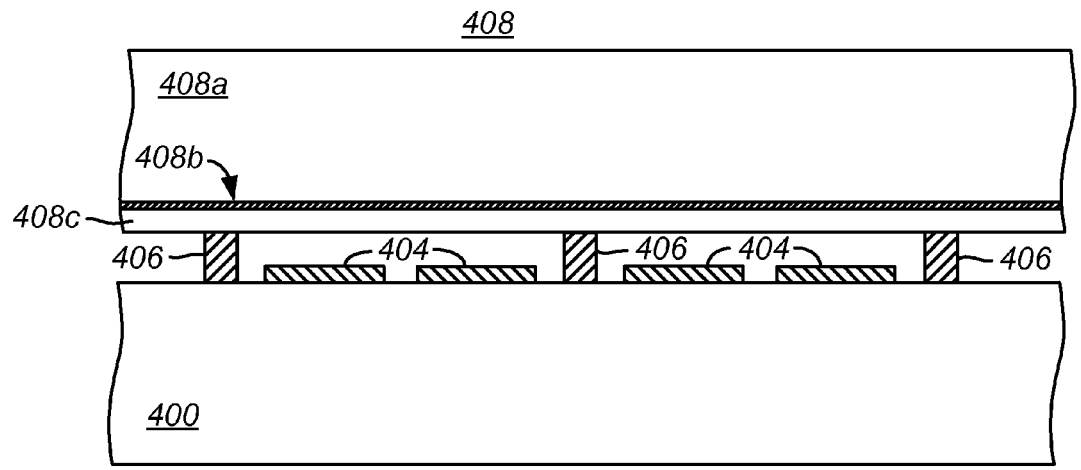

As shown in FIG. 4C, a silicon-on-insulator (SOI) wafer 408 is brought into physical proximity to the CMOS substrate. In FIG. 4D, the SOI wafer 408 is brought into contact with and bonded to spacer structures 406. Bonding can occur using a variety of techniques. In a specific embodiment, the bonding occurs using a room temperature covalent bonding process. Each of the faces is cleaned and activated, e.g., by plasma activation or by wet processing. The activated surfaces are brought in contact with each other to cause a sticking action. In some bonding processes, mechanical force is provided on each substrate structure to press the faces together. In embodiments in which an SOI substrate is used with a silicon layer and the spacer structures are silicon oxide, silicon bearing bonds are created between the two faces. In alternative embodiments, an oxide layer is formed on the silicon surface of the SOI substrate prior to bonding to provide an oxide-oxide bond interface. The upper surface of the layer from which spacer structures are formed is polished by a CMP process in one embodiment while the bonding surface of the SOI substrate is polished as well, providing an extremely smooth surface that is conducive to covalent bonding processes. Of course, one of ordinary skill in the art would recognize many other variations, modifications, and alternatives.

Because the standoff regions and the electrodes are formed on substrate 400, the alignment tolerances for the wafer bonding process are greatly relaxed in comparison to some conventional techniques. For example, in some embodiments of the present invention, the tolerance requirement for aligning the two substrates prior to joining is less than 1 cm. Tolerance requirements on the order of millimeters are therefore available through embodiments of the present invention, in contrast to tolerance requirements on the order of microns for some conventional structures.

Figure 4E:
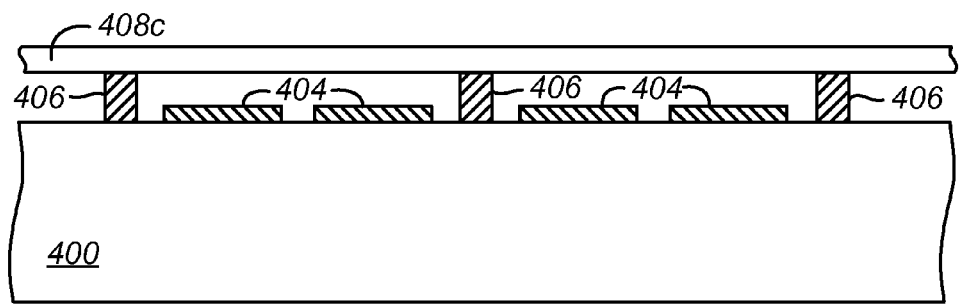

In FIG. 4E, the bonded SOI substrate is subjected to a sequence of processes to remove material to leave silicon reflecting surface 408c supported by spacer structures 406. In particular, silicon 408a on the bonded SOI substrate is removed quickly utilizing a grinding process, leaving a roughened silicon surface overlying the oxide layer 408b. Next, the roughened silicon surface is removed selective to the oxide layer 408b by a chemical etchback process. The buried oxide layer serves as an etch stop in one embodiment of the present invention, in which the SOI substrate is thinned by an etch process.

The oxide layer 408b is then removed utilizing a different chemical etching process selective to oxide over silicon, yielding reflecting silicon surface 408c. Plasma ashing is used in some embodiments to remove the buried oxide layer and expose reflecting silicon surface 408c. Other material removal processes (e.g., CMP processes) are utilized to expose the oxide layer in other embodiments. One of ordinary skill in the art would recognize many variations, modifications, and alternatives.

Figure 4F:
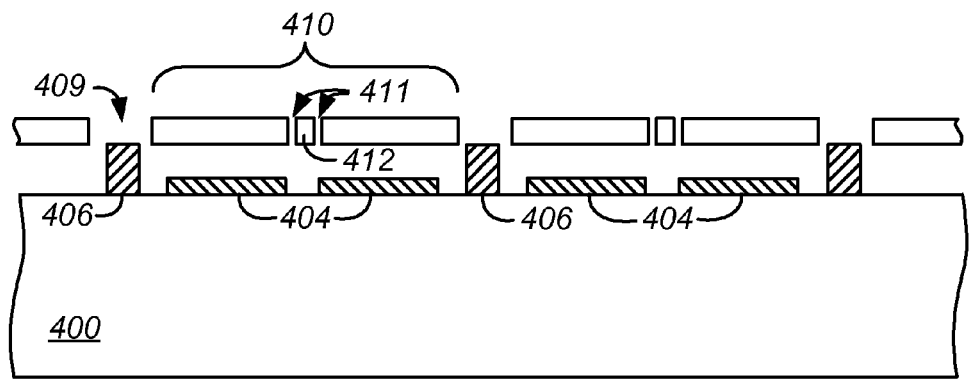

As shown in FIG. 4F, reflecting silicon surface 408c is then selectively etched to define gaps 409 separating individual mirrors 410. These mirrors in accordance with embodiments of the present invention have a width slightly greater than a diameter of the laser beam incident thereto and reflecting therefrom. For example, individual etched mirrors may exhibit a width of between about 100 μm to about 500 μm. In other embodiments, the width of the mirrors is about 4 mm by about 4 mm. Of course, the particular dimensions will depend on the particular application.

As also shown in FIG. 4F, the reflecting silicon surface 408c is also selectively etched to form gaps 411 within individual mirrors 410. Gaps 411 define hinge portions 412 about which the individual mirrors can rotate. The orientation of the gaps can dictate the rotational capabilities of the reflecting surface, for example as shown above in FIGS. 2 and 3.

Embodiments of processes for fabricating a scanning mirror according to the present invention are disclosed in U.S. Pat. Nos. 7,092,140, 7,022,245, and 7,118,234, each of which is herein incorporated by reference.

Figure 5A:
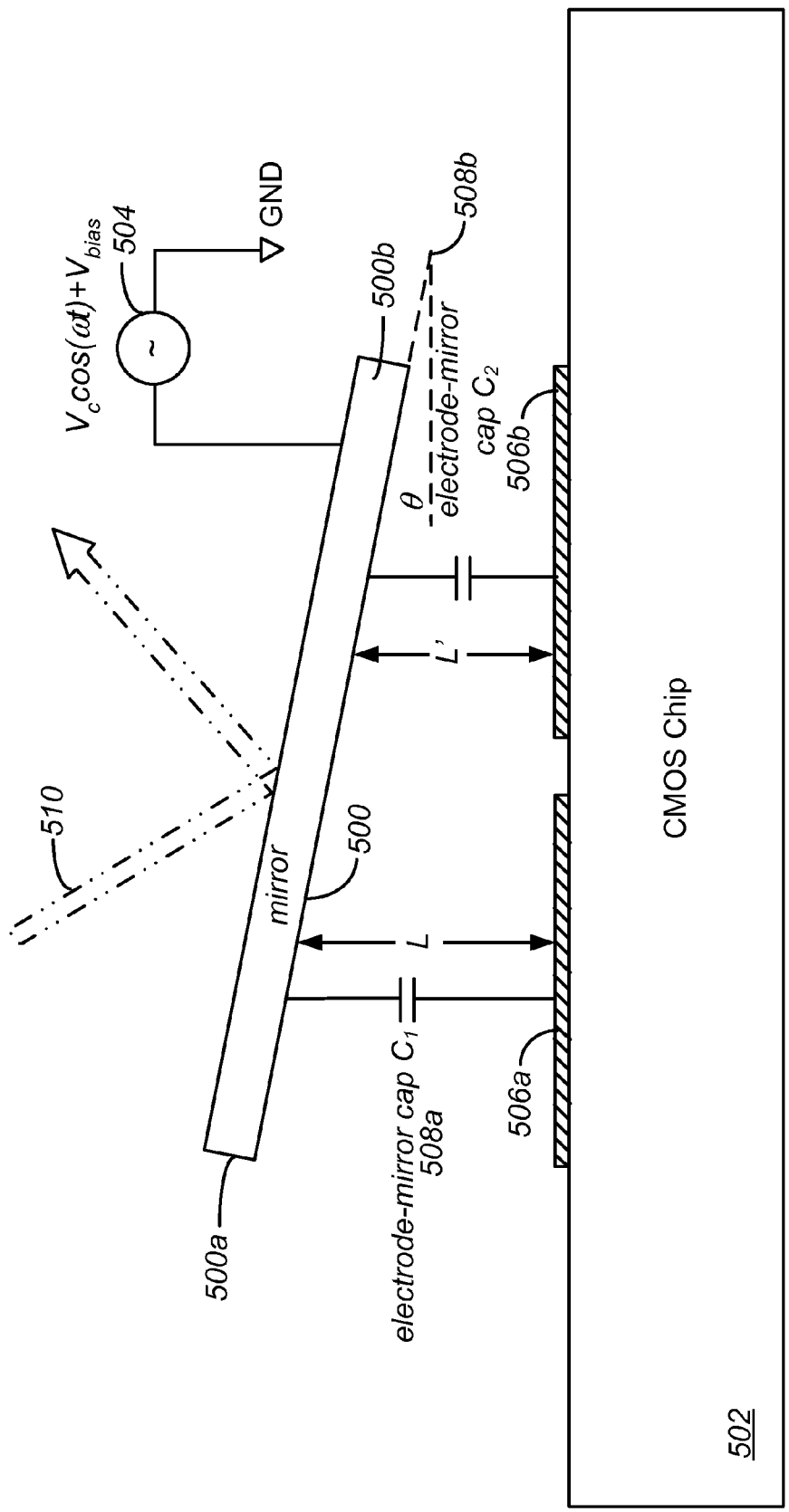
FIG. 5A is a simplified schematic view of one embodiment of a system in accordance with the present invention for sensing positioning of a mirror.
Figure 5B:
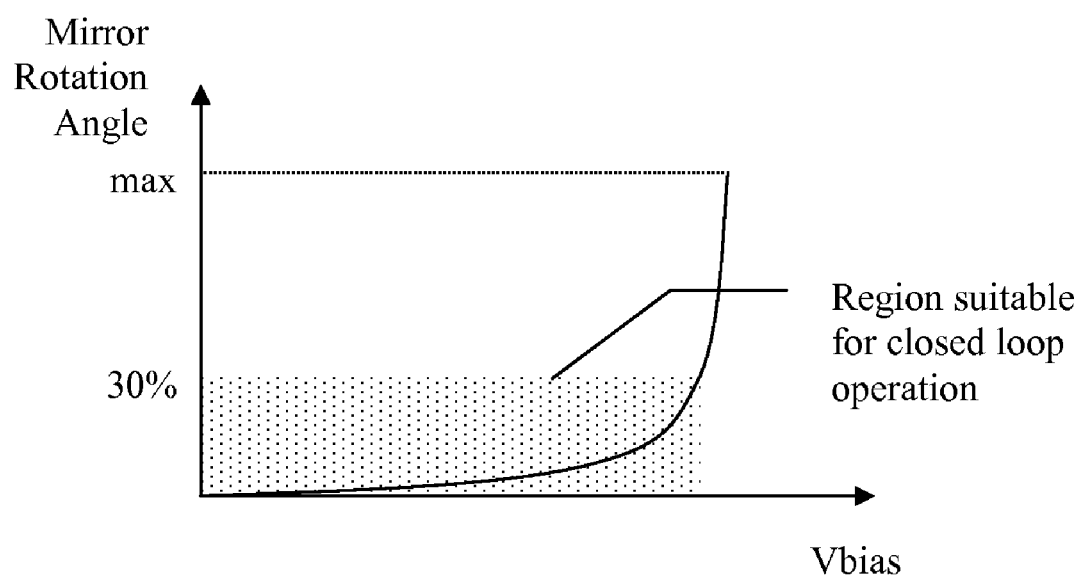
FIG. 5B is a plot of the relationship between the mirror rotation angle and the bias voltage according to an embodiment of the present invention.

As indicated in FIG. 1, it is important to sense the exact position of the scanning mirror in order to identify the precise location at which printing will occur. Accordingly, FIG. 5A is a simplified schematic view of one embodiment of a system in accordance with the present invention for sensing positioning of the scanning mirror. The rotation angle of an voltage-actuated mirror has a nonlinear dependence on the drive voltage. An example of the relationship between the mirror rotation angle and the bias voltage is illustrated in FIG. 5B. Additional discussion related to the rotation angle is provided in U.S. Pat. No. 4,317,611 to Petersen). Typically, for a given design, within the first 30% of the maximum rotation angle, the mirror can be accurately positioned at a desired angle under closed loop operation. However, beyond the exemplary 30% maximum rotation angle, it is difficult to maintain stable feedback and the mirror could enter a "point of no return" and "snap" to the maximum angle of rotation due to the nonlinear response of the mirror to the drive voltage.

In particular, FIG. 5A shows scanning mirror 500 supported over CMOS substrate 502 and rotatable about X-axis extending into and out of the page. A constant bias voltage ($V_{bias}$) is applied to the mirror 500, together with a varying voltage component ($V_c \cos(\ddot{y}_t)$) from a variable voltage generator 504.

CMOS substrate 502 bears electrode pair 506a and 506b. These electrodes, together with the ends 500a and 500b of reflecting surface 500 and the gaps L and L' between the electrodes 504a and 504b, respectively and the reflecting surface, define a pair of electrode structures 508a and 508b. These electrode structures exhibit capacitances of $C_1$ and $C_2$, respectively.

During operation of the scanning mirror, the reflecting surface is actuated so that one end tilts closer to the substrate and the other end tilts away from the substrate. This allows incident laser light 510 to be reflected toward the photosensitive element in the manner shown.

A change in position of the end of the reflecting surface relative to an underlying substrate, will change the distance of the gap between the electrode and the reflecting surface, thereby altering the capacitance. In accordance with an embodiment of the present invention, this changed capacitance can be sensed to detect the precise position of the mirror.

In certain embodiments, the changed capacitance can be detected on the same electrodes to which voltage is provided to actuate the position of the reflecting surface. In accordance with other embodiments, separate electrodes may be used to detect and correct for the actual position of the mirror.

Figure 6:
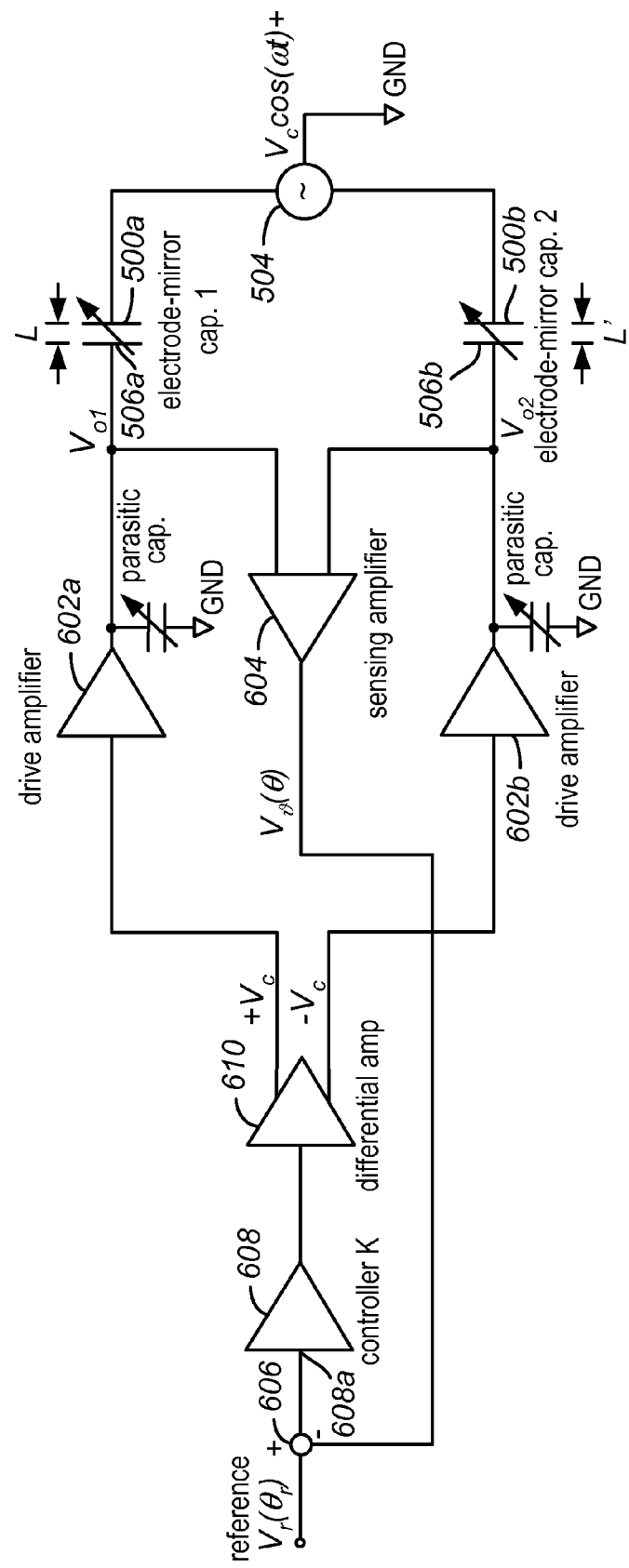
FIG. 6 is a simplified schematic view of an embodiment of a circuit in accordance with an embodiment of the present invention for sensing and controlling mirror position.

For example, FIG. 6 is a simplified schematic view of an embodiment of a circuit in accordance with an embodiment of the present invention for detecting and controlling mirror position. Specifically, voltage supply 504 provides variable voltage ($V_{bias}+V_c \cos(\ddot{y}_t)$) to the ends of the movable reflecting surface.

Drive amplifiers 602a and 602b provide voltage to the electrodes 506a and 506b, respectively. A difference in voltage between the electrodes 506a and 506b and ends 500a and 500b, respectively, of the reflecting surface 500 gives rise to a first electrode-mirror capacitance (cap. 1) and a second electrode-mirror capacitance (cap. 2). Voltages on the electrodes 506a and 506b are fed as inputs to sensing amplifier 604, which is configured to output a voltage signal corresponding to the difference between them. Because any voltage difference at the electrodes is attributable to a change in the gap between the mirror end and the electrodes, and hence an angle ($\ddot{y}$) of inclination of the mirror, the output of sensing amplifier x is a function of $\ddot{y}$: ($V_1(\ddot{y})$).

This output of the sensing amplifier is fed to node 606 in electrical communication with a reference voltage ($V_r(\ddot{y}_r)$) and with an input node of a controller 608. The reference voltage is calibrated based upon known values expected from a particular angle of inclination of the mirror. Based upon the voltage received at the input node 608a of the controller 608, the controller outputs a pair of voltages to the drive amplifiers 602a and 602b respectively, to bias the reflecting surface to the angle that is expected based upon the reference voltage. In this manner, the circuit shown in FIG. 6 provides a closed loop system utilizing capacitance to detect any deviation of the mirror position from its expected value, and correct that deviation.

Figure 7:
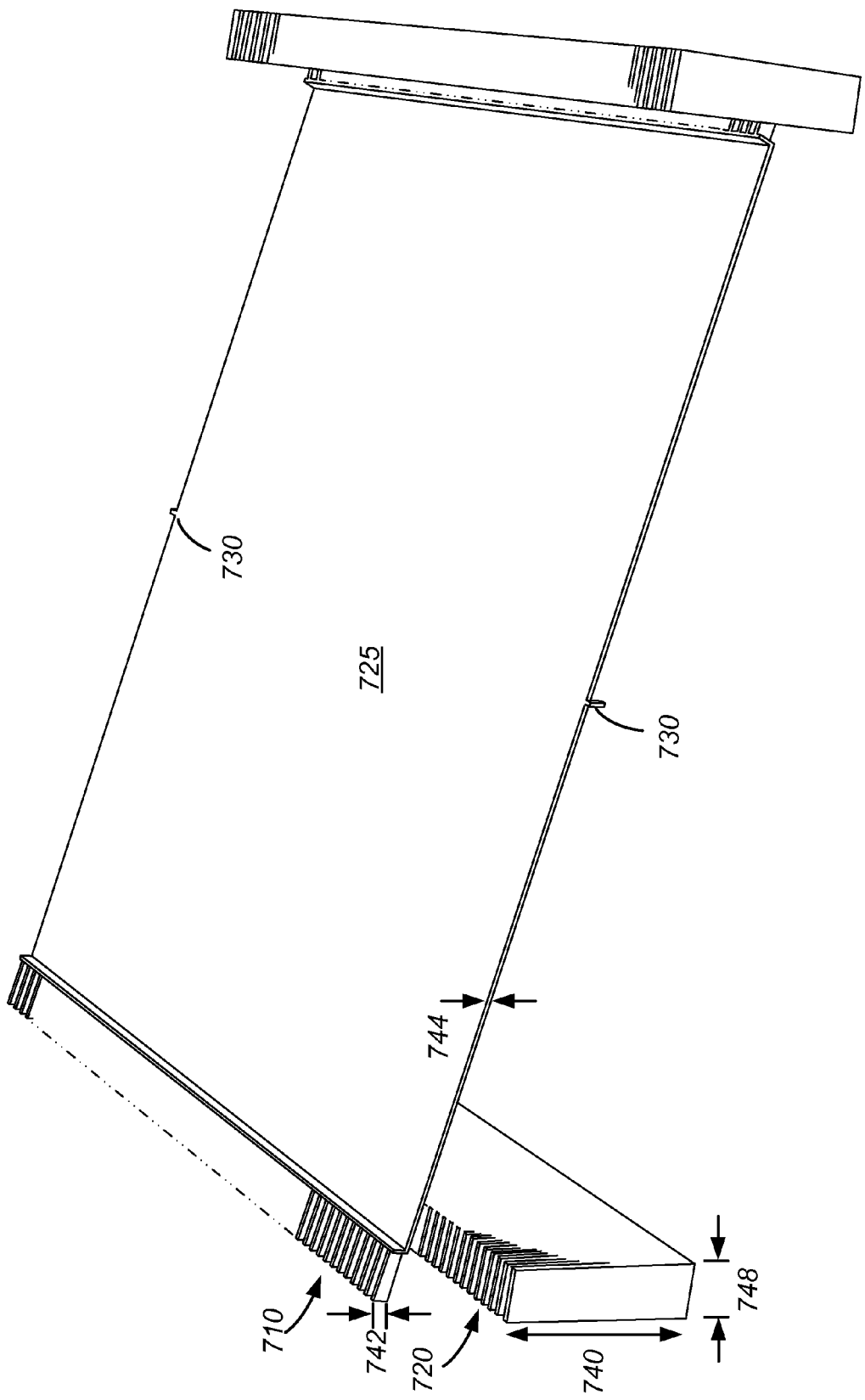
FIG. 7 is a simplified perspective illustration of a MEMS mirror system according to an embodiment of the present invention.
Figure 8:
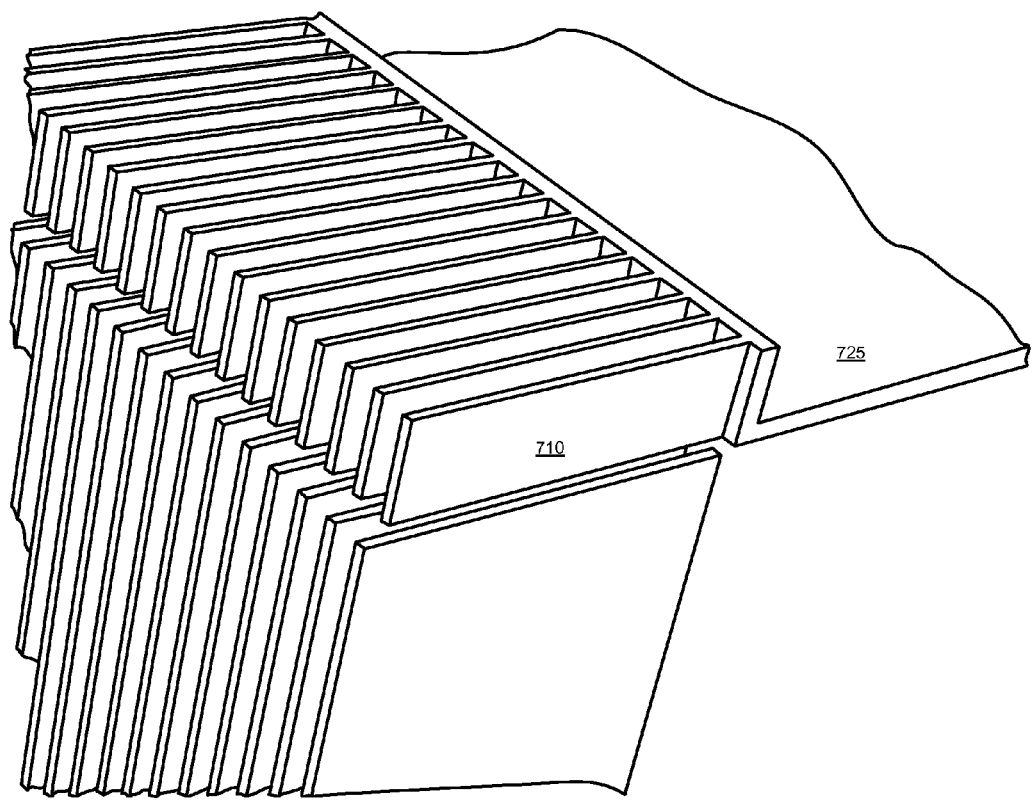
FIG. 8 is a simplified perspective illustration of a portion of the MEMS mirror system illustrated in FIG. 7.

FIG. 7 is a simplified perspective illustration of a MEMS mirror system according to an embodiment of the present invention. FIG. 8 is a simplified perspective illustration of a portion of the MEMS mirror system illustrated in FIG. 7. Referring to FIG. 7, a number of moveable fingers 710 and a number of fixed fingers 720 form an electrostatic comb actuator that is configured to rotate the mirror plate 725 about an axis defined by torsion hinges 730. Although only a single torsion hinge is illustrated in FIG. 7, an additional torsion hinge opposing the illustrated torsion hinge is provided on the back side of the mirror plate. The present invention utilizes vertical or "out of plane" electrostatic comb actuators, which differ in some respects from lateral comb actuators commonly found in various sensors such as accelerometers. The embodiment illustrated in FIG. 7 provides benefits including low activation voltage in comparison to some MEMS designs due to the small spacing between the moveable fingers and the fixed fingers. Additionally, the large surface area provided by the moveable and fixed fingers provides for increase electrostatic forces for a given separation distance. Thus, embodiments of the present invention provide for higher rotational bandwidths for a given electrode voltage in comparison with some MEMS designs. Moreover, because of the large electrostatic forces achieved by embodiments due, in part, to the close electrode spacing and large electrode surface area, stiffer torsion hinges are utilized by the designs described herein, further increasing the rotational bandwidth over some MEMS designs.

In a specific embodiment, the number of finger pairs is about 100 pairs. The particular number of the geometry illustrated in FIG. 7 enables the mirror plate 725 to rotate clockwise and counter-clockwise in response to actuation by the comb actuator. As illustrated in FIG. 7, the mirror plate is tilted clockwise at an angle of about 15 degrees. According to embodiments of the present invention, the mirror plate is able to rotate about ±20 degrees in response to electrostatic actuation.

In the embodiment illustrated in FIGS. 7 and 8, the height 740 of the fixed fingers is about 700 ÿm, the height 742 of the moveable fingers is about 50 ÿm, the thickness 744 of the mirror plate is about 10 ÿm, the width of the fixed fingers and the moveable fingers is about 5 ÿm, and the length 748 of the fixed fingers and moveable fingers is about 200 ÿm. Of course, in other embodiments, to provide desired rotation angles and electrostatic forces, the various dimensions could be varied depending on the particular application. The mirror's dynamic deformation is a function of mirror size, mirror thickness, scanning frequency, rotational angle, and the like. Adding a meshed pattern in the back of the mirror can help reduce the peak-to-peak dynamic deformation to a level smaller than ⅟₁₀ of the wavelength, thereby preventing diffraction from limiting the optical performance of the scanning mirror. It will be appreciated that by utilizing one or more additional masking steps, meshed or other patterns can be implemented in the various structures described herein, for example, the structures illustrated in FIGS. 2-5 and 7. One of ordinary skill in the art would recognize many variations, modifications, and alternatives. The mirror illustrated in FIG. 7 is square in shape, with a top surface of 4 mm by 4 mm, but this is not required by embodiments of the present invention. Depending on the printing application, the surface area of the mirror will be selected as a function of the light beams used in the printing process, the scan rate, the optical system, and the like.

Referring to FIG. 8, the moveable fingers 710 are attached to the mirror plate 725 with the top of the mirror plate flush with the tops of the moveable fingers. In another embodiment, which is described more fully in relation to the fabrication processes described below, the bottom of the mirror plate is flush with the bottoms of the moveable fingers. Depending on the process flow utilized to fabricate the scanning mirror and comb actuator, either configuration can be utilized. Upon actuation, the moveable fingers move vertically between the fixed fingers, thereby rotating the mirror plate about the torsion hinge 730. The present inventors have determined that in one configuration, if the electrodes are biased at a voltage of about 200 V, the mirror plate can rotate to ±19.4 degrees at a rate of 4.5 kHz. Depending on the degree of rotational damping provided by the mirror plate, torsion hinge, and/or the environment of the mirror package, the rotation rate can vary, providing other rotation rates suitable to the particular application.

The scanning mirror illustrated in FIG. 7 is fabricated and then mounted on an electrode substrate (not shown), which may be a CMOS substrate or other suitable substrate having electrode contact locations. The fixed finger electrodes are provided with electrical contact to one or more electrodes contacts present on the substrate and thereby electrical communication between drive electronics and the fixed finger electrodes is provided. Additionally, one or more separate electrode contacts are provided in order to provide electrical communication to the moveable finger electrodes. In an embodiment, the electrical communication with the moveable finger electrodes is provided through the frame, the torsion hinges, and the mirror plate. It should be noted that the capacitive position sensors described above can be utilized in combination with the scanning mirror with vertical comb actuators described herein.

FIGS. 9A to 9D is a simplified process flow for the fabrication of a MEMS mirror system according to an embodiment of the present invention. The fabrication process utilizes a silicon-on-insulator (SOI) substrate having a first single crystal silicon layer approximately 700 μm thick, an oxide layer, approximately 1-2 μm thick, and a second single crystal silicon layer approximately 50 μm thick. As described more fully below, the moveable fingers 710 are fabricated in the 50 μm thick second layer while the fixed fingers 720 are fabricated in the 700 μm thick first layer. Although single crystal silicon layers are utilized in the embodiment described herein, this is not required by embodiments of the present invention since layers containing other materials such as polysilicon, silicon nitride, and the like are included within the scope of the present invention.

Figure 9A:
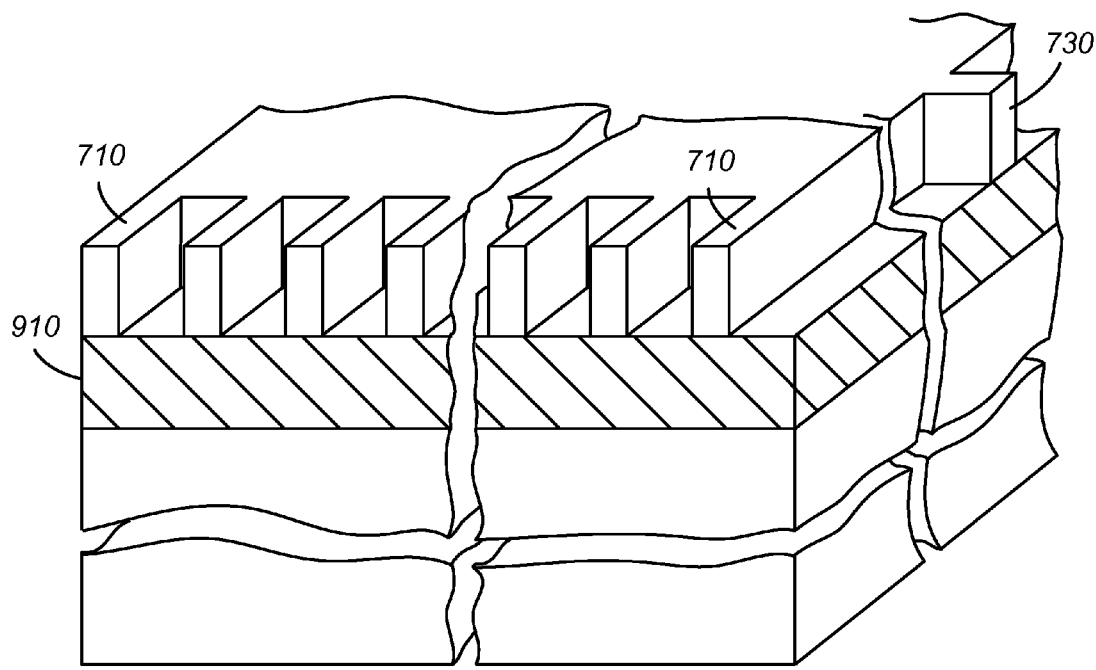
FIGS. 9A to 9C is a simplified process flow for the fabrication of a MEMS mirror system according to an embodiment of the present invention.
Figure 9B:
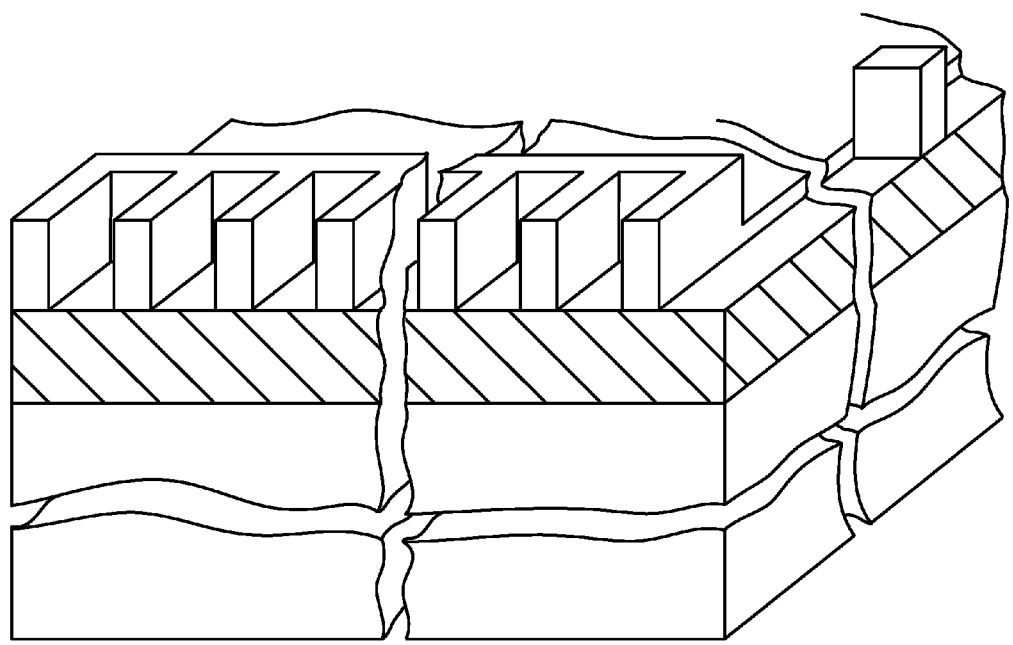

In the process illustrated in FIG. 9A, the moveable fingers and the torsion hinge are masked and etched in the second single crystal silicon layer. The masking step is not illustrated for purposes of clarity. The dimensions of the moveable fingers and the torsion spring hinge are selected in accordance with design considerations including electrode area, hinge stiffness, and the like.

In the embodiment illustrated in FIG. 9A, the etching or other process(es) utilized to remove silicon material between the moveable fingers and along the edge of the mirror plate is a reactive ion etch (REI) process that is timed to end at the oxide layer 910. In other embodiments, combination physical/chemical etch processes are utilized that remove the majority of the silicon material using an RIE process and then expose the oxide layer utilizing a preferential chemical etch. The mask layer is removed after completion of the etching processes.

In order to define the thickness of the mirror plate, the first single crystal silicon layer is masked and the central portions o the first single crystal silicon layer is removed using an etching or other suitable process. In the illustrated embodiment, the layer is etched using a timed etch that removes approximately 40 ÿm of material, leaving about 10 ÿm of silicon material remaining. In other embodiments, the particular time and/or other etch process parameters are selected to provide the desired thickness of the mirror plate. Thus, although a thickness of 10 ÿm is utilized in one embodiment, this is not required by the present invention. One of ordinary skill in the art would recognize many variations, modifications, and alternatives.

Figure 9C:
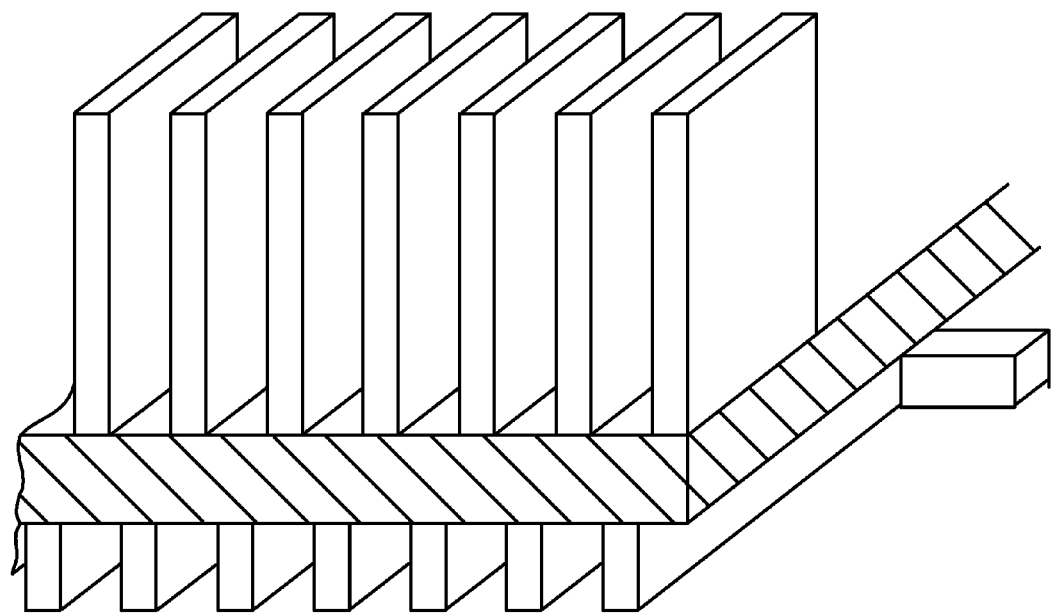

FIG. 9C is a simplified illustration of the fabrication of the fixed fingers according to an embodiment of the present invention. The SOI substrate has been flipped over so that the moveable fingers are facing down. Then, the first single crystal silicon layer is masked and etched or otherwise processed to remove the material between the fixed fingers as well over the already defined mirror plate. Thus, the illustrated etch step removes approximately 700 ÿm of material, exposing the oxide layer 910. As discussed in relation to FIG. 9A, a combination physical/chemical etch process may be utilized to remove the majority of the silicon material of the first single crystal silicon layer using an RIE process and then expose the oxide layer utilizing a preferential chemical etch. One of ordinary skill in the art would recognize many variations, modifications, and alternatives. The mask layer is removed after completion of the etching process. The oxide layer of the SOI substrate is removed to release the mirror structure and enable the moveable fingers to slide between the fixed fingers in response to electrostatic actuation. The torsion spring hinges, which are attached to a frame structure, illustrated in FIGS. 9E and 9F, are also released when the oxide layer is removed.

Figure 9D:
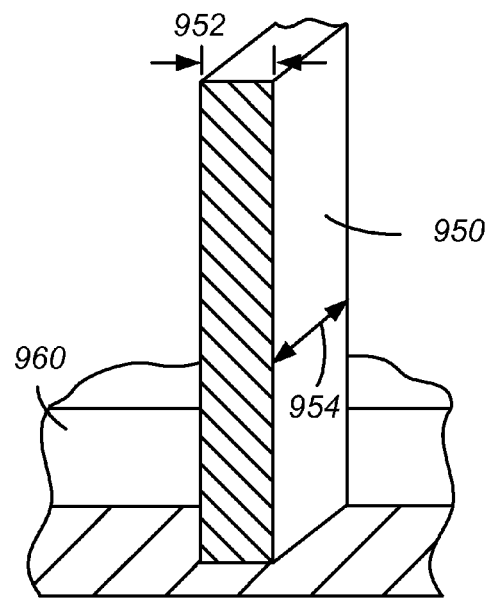
FIG. 9D is a simplified illustration of a portion of a torsion hinge according to an embodiment of the present invention.

FIG. 9D is a simplified illustration of a portion of a torsion hinge according to an embodiment of the present invention. As illustrated in FIG. 9D, the hinge 950 extends away from the mirror plate 960 to attach to a frame structure (not illustrated). The structure illustrated in FIG. 9D would be present after the removal of the material in the central portion of the second single crystal silicon layer, thereby defining the thickness of the mirror plate. The particular geometry of the torsion spring hinge, 50 ÿm tall, 15 ÿm wide (reference number 952), and 10 ÿm long (reference number 954) are defined during the masking and etching processes described previously.

Figure 9E:
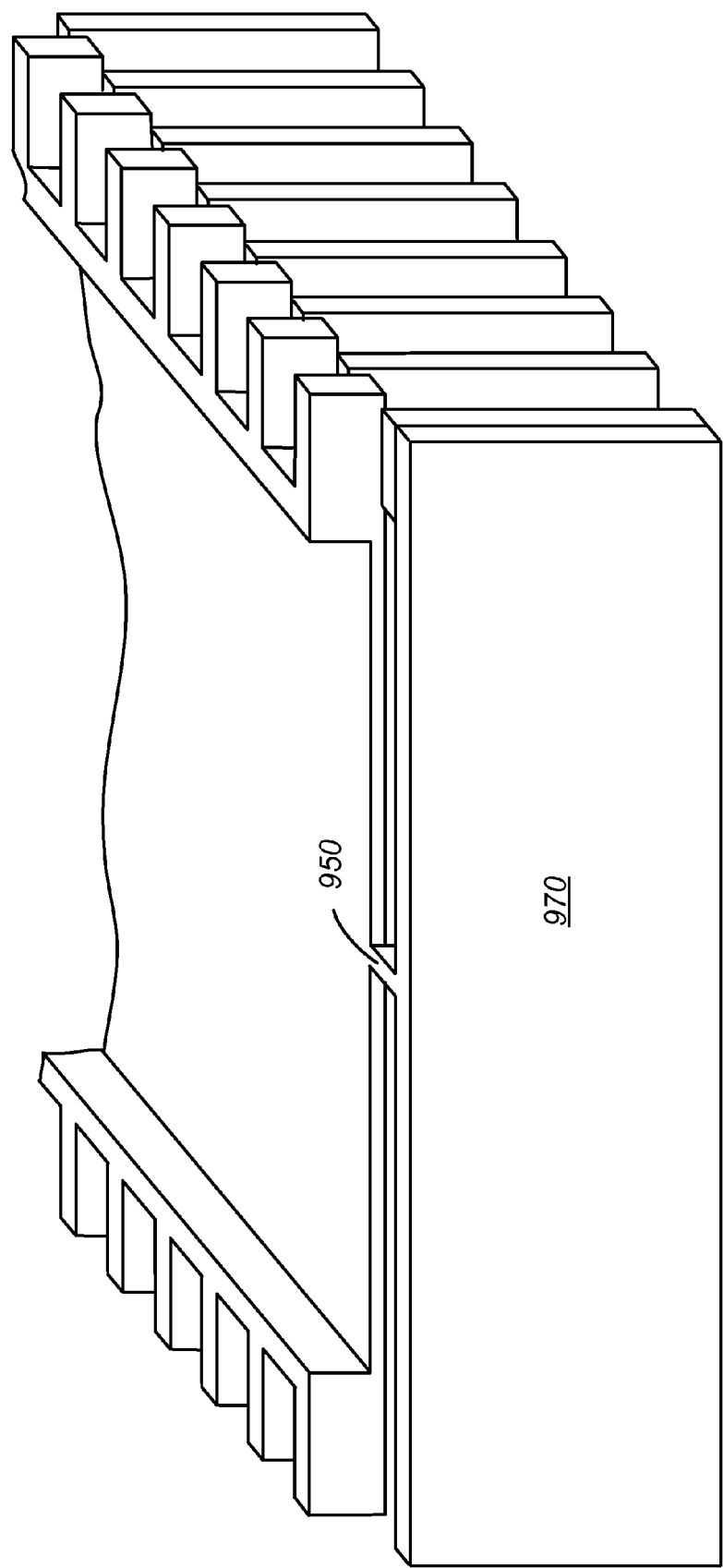
FIG. 9E is a simplified perspective illustration of a MEMS mirror system fabricated according to the method illustrated in FIGS. 9A to 9D.

FIG. 9E is a simplified perspective illustration of a MEMS mirror system fabricated according to the method illustrated in FIGS. 9A to 9D. Frame structure 970 is attached to the torsion spring hinges 950 and mounted on an electrode substrate (not shown) that includes electrical contact pads in electrical communication with the fixed fingers as well as the moveable fingers and the mirror plate. The frame structure provides for mechanical support for the fixed fingers as well as the torsion spring hinges, which, in turn, provide mechanical support to the mirror plate and moveable fingers.

FIG. 9F is a simplified top view illustration of a MEMS mirror system fabricated according to the method illustrated in FIGS. 9A to 9D. In FIG. 9F, the mechanical connection between the frame structure and the torsion spring hinges is illustrated. The right side of the mirror plate 990 moves into the page upon activation in a first rotation direction (e.g., clockwise rotation). The left side of the mirror plate moves into the page upon activation in a second rotation direction (e.g., counter-clockwise rotation) opposed to the first rotation direction.

Figure 10:
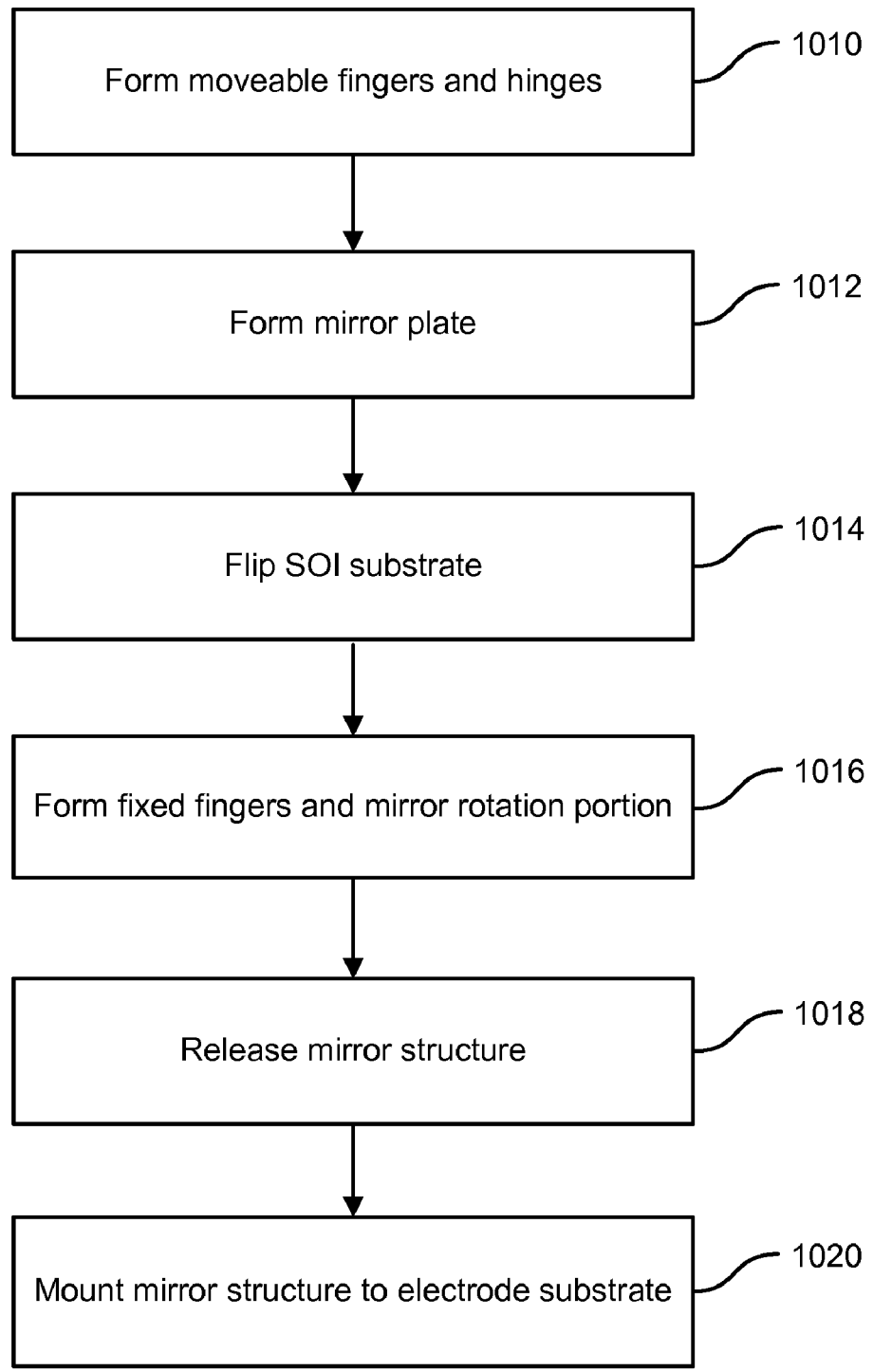
FIG. 10 is a simplified flowchart illustrating a process flow for fabricating a MEMS mirror according to an embodiment of the present invention.

FIG. 10 is a simplified flowchart illustrating a process flow 1000 for fabricating a MEMS mirror according to an embodiment of the present invention. Moveable fingers and hinges are formed in the substrate (e.g., an SOI substrate) (1010). In a particular embodiment, the moveable fingers and torsion spring hinges are etched from a single crystal silicon layer of the SOI substrate after a masking step is performed. This etching process exposes the insulator layer of the SOI substrate, for example, the silicon oxide layer. A mirror plate is formed (1012) by removing additional material from the layer from which the moveable fingers and the hinges were formed. As will be evident to one of skill in the art, additional masking and mask removal steps will be utilized as appropriate.

The SOI substrate is flipped over to provide access to the other silicon layer of the SOI substrate. A masking and removal (typically etching) process is utilized to form the fixed fingers from the other silicon layer (1016). In embodiments of the present invention, the fixed fingers are significantly thicker than the moveable fingers. The mirror rotation region is also formed (1016) by removing a portion of the other silicon layer. As illustrated in FIG. 7, the central portion of the 700 ÿm thick layer is removed to enable the mirror to rotate freely in both clockwise and counter-clockwise directions.

The mirror structure is released (1018) using a chemical etching process that removes the silicon oxide insulating layer of the SOI substrate. The removal of the oxide layer between the moveable and fixed fingers enables the moveable fingers to move both vertically and laterally since they are interlaced with the fixed fingers. After fabrication of the mirror structure, the structure is mounted to an electrode substrate (e.g., a CMOS substrate) that includes electrodes and contact pads configured to provide electrical signals to the MEMS mirror structure. In an embodiment, the oxide in the area of the moveable fingers and hinges is selectively removed to maintain the oxide under the hinges and thereby provide a mechanical connection to the bottom substrate. This includes, in one example, definition of a large open area and control of the wet etch time.

It should be appreciated that the specific steps illustrated in FIG. 10 provide a particular method of fabricating a MEMS mirror according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

In an alternative embodiment, the mirror plate is aligned with the top of the moveable fingers. Referring to FIG. 8, the embodiment illustrated in relation to the process flow in FIGS. 9A-9D and FIG. 10 has the mirror plate aligned with the bottom of the moveable fingers. In order to fabricate a mirror structure with the mirror plate aligned with the top of the moveable fingers, the moveable fingers and the torsion spring hinges are defined using an etching or other material removal process. The SOI substrate is then flipped to provide access to the thicker silicon layer. The stationary or fixed fingers are then etched along with the cavity in the central portion of the thicker silicon layer, thereby providing for a rotation space for the mirror plate. The insulator (e.g., silicon oxide) layer of the SOI substrate is removed, for example, through the use of a chemical or other etching process.

The thickness of the mirror plate is defined by etching from the side of the mirror structure including the fixed fingers. Utilizing a timed etch, a portion of the thinner silicon layer is removed, forming a mirror plate with the top aligned with the top of the moveable fingers. One of ordinary skill in the art would recognize many variations, modifications, and alternatives.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of fabricating a scanning mirror for a laser printing apparatus, the method comprising:
   providing silicon-on-insulator (SOI) substrate comprising a first silicon layer, a silicon oxide layer abutting the first silicon layer, and a second silicon layer abutting the silicon oxide layer;
   forming a set of moveable electrode fingers from a first portion of the second silicon layer;
   forming a mirror plate from a second portion of the second silicon layer;
   forming a set of fixed electrode fingers from a first portion of the first silicon layer;
   forming a mirror rotation region from a second portion of the first silicon layer;
   removing the silicon oxide layer to form a mirror structure; and
   mounting the mirror structure on an electrode substrate.

2. The method of claim 1 wherein the first silicon layer comprises single crystal silicon material.

3. The method of claim 1 wherein the second silicon layer comprises single crystal silicon material.

4. The method of claim 1 wherein a surface of the second silicon layer abutting the silicon oxide layer defines a surface of the set of moveable electrode fingers and a surface of the mirror plate.

5. The method of claim 1 wherein removing the silicon oxide layer comprises performing a chemical etch process.

6. The method of claim 1 wherein the electrode substrate comprises a complementary metal oxide semiconductor (CMOS) substrate.

7. A method of fabricating a micro electro-mechanical device, the method comprising:
providing a substrate comprising a first silicon layer, a silicon oxide layer abutting the first silicon layer, and a second silicon layer abutting the silicon oxide layer;
forming a first set of electrode fingers from a first portion of the second silicon layer;
forming a mirror plate from a second portion of the second silicon layer;
forming a second set of electrode fingers from a first portion of the first silicon layer;
forming a mirror rotation region from a second portion of the first silicon layer;
removing the silicon oxide layer to form a mirror structure; and
mounting the mirror structure on an electrode substrate.

8. The method of claim 7 wherein the substrate comprises a silicon-on-insulator (SOI) substrate.

9. The method of claim 7 wherein the first set of electrode fingers are movable.

10. The method of claim 7 wherein the second set of electrode fingers are fixed.

11. The method of claim 7 wherein the first silicon layer comprises single crystal silicon material.

12. The method of claim 7 wherein the second silicon layer comprises single crystal silicon material.

13. The method of claim 7 wherein the electrode substrate comprises a complementary metal oxide semiconductor (CMOS) substrate.

14. A method comprising:
providing a silicon-on-insulator (SOI) substrate comprising a first silicon layer, a second silicon layer, and an insulating layer disposed between the first silicon layer and the second silicon layer;
providing access to the second silicon layer;
forming a set of movable electrode fingers from a first portion of the second silicon layer;
forming a mirror plate from a second portion of the second silicon layer;
orienting the SOI substrate to provide access to the first silicon layer;
forming a set of fixed electrode fingers from a first portion of the first silicon layer;
forming a mirror rotation region from a second portion of the first silicon layer; and
mounting the SOI substrate onto an electrode substrate.

15. The method of claim 14 wherein the first silicon layer comprises a single crystal silicon material.

16. The method of claim 14 wherein the second silicon layer comprises a single crystal silicon material.

17. The method of claim 14 further comprising removing the silicon oxide layer after forming the mirror rotation region.

18. The method of claim 14 wherein the electrode substrate comprises a complementary metal oxide semiconductor (CMOS) substrate.

* * * * *